United States Patent [19]
Fujii et al.

[11] Patent Number: 4,891,984
[45] Date of Patent: Jan. 9, 1990

[54] ACCELERATION DETECTING APPARATUS FORMED BY SEMICONDUCTOR

[75] Inventors: Tetsuo Fujii, Toyohashi; Osamu Itoh, Kariya, both of Japan

[73] Assignee: Nippondenso Co., Ltd., Kariya, Japan

[21] Appl. No.: 917,103

[22] Filed: Oct. 8, 1986

[30] Foreign Application Priority Data

Oct. 8, 1985 [JP] Japan ................... 60-224066

[51] Int. Cl.⁴ .................................. G01P 15/12
[52] U.S. Cl. .................... 73/517 R; 73/651; 338/46
[58] Field of Search ............ 73/516 R, 517 R, 651, 73/DIG. 1, 510; 338/2, 46; 29/610 SG

[56] References Cited

U.S. PATENT DOCUMENTS

| | | | |
|---|---|---|---|
| 3,304,787 | 2/1967 | Chiku et al. | 73/517 R |
| 4,342,227 | 8/1982 | Petersen et al. | 73/517 R |
| 4,507,705 | 8/1985 | Hoshino et al. | 73/DIG. 1 |
| 4,653,326 | 3/1987 | Danel et al. | 73/517 R |

OTHER PUBLICATIONS

L. M. Roylance et al., "A Batch—Fabricated Silicon Accelerometer", *IEEE Transactions on Electron Devices*, vol. ED—26, No. 12, (Dec. 1979), pp. 1911–1917.

*Primary Examiner*—John Chapman
*Attorney, Agent, or Firm*—Cushman, Darby & Cushman

[57] ABSTRACT

First to third frames are formed by etching to penetrate a silicon substrate on the substrate. A plurality of thin cantilevered beams are formed in different lengths by cutting by etching the substrate in the frames; the beams formed in the first frame are formed perpendicular to the surface of the substrate to bend only in the X-axis direction, parallel to the surface of the substrate; the beams formed in the second frame are formed perpendicular to the surface of the substrate to bend only in the Y-axis direction, parallel to the surface of the substrate; and the beams formed in the third frame are formed to bend only in the Z-axis direction, perpendicular to the surface of the substrate. Masses are formed at the free ends of the beams, and piezo resistance layers are formed at the fixed ends. Signals generated from the piezo resistance layers by an integrated circuit are supplied to the regions, different from the regions formed of the first to third frames, of the substrate to form a signal processor for generating acceleration detection signals.

5 Claims, 4 Drawing Sheets

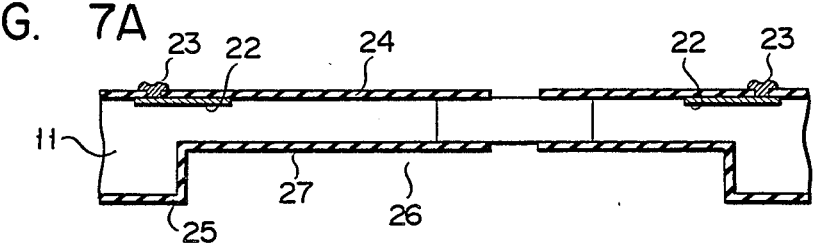
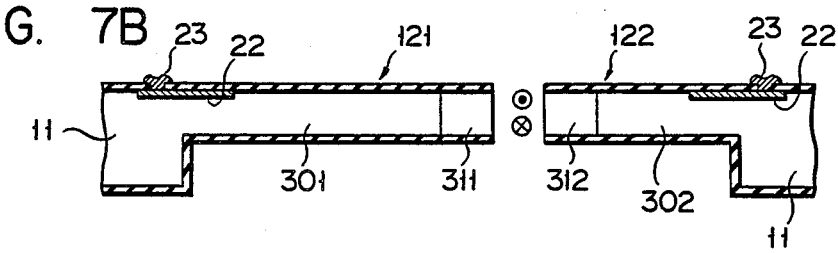
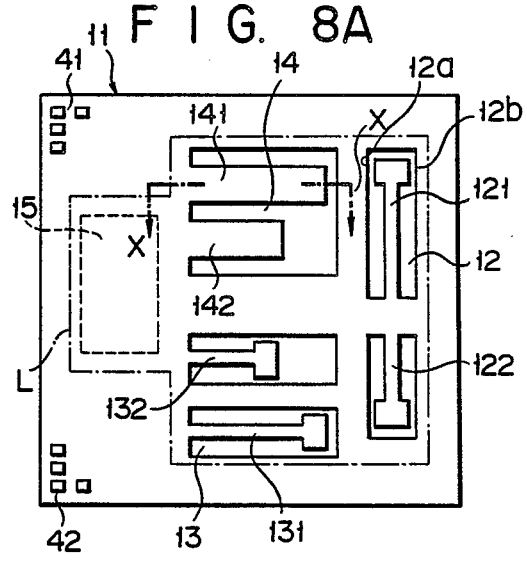
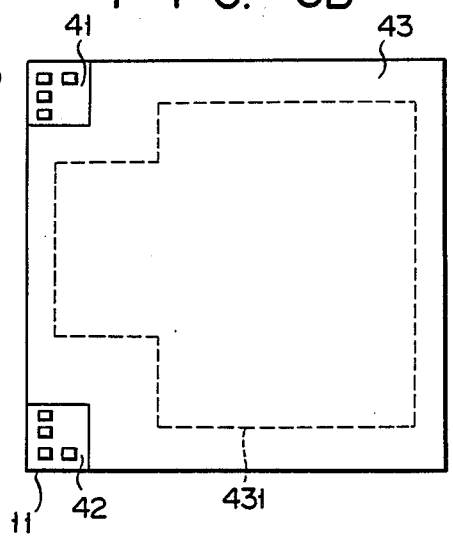
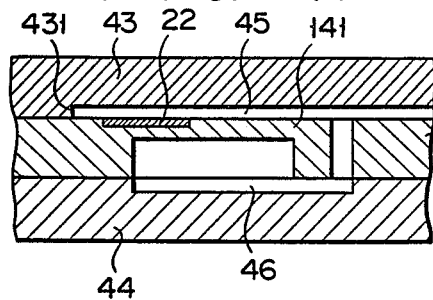
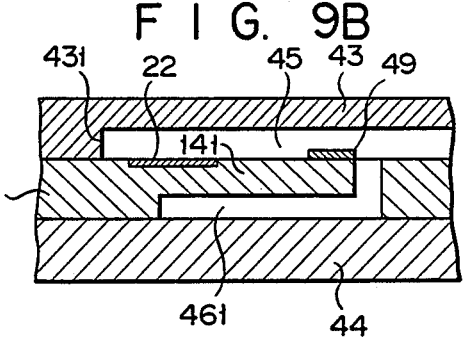

ACCELERATION DETECTING APPARATUS FORMED BY SEMICONDUCTOR

BACKGROUND OF THE INVENTION

The present invention relates to an acceleration detecting apparatus formed by a semiconductor effectively capable of executing an electronic suspension control by detecting, for example, the acceleration state or the fluctuating motion of an automobile, being able to detect the acceleration or the vibration, for instance, in three dimensions by means of one semiconductor element.

When detecting a moving object, for example, in three dimensions, three detectors for detecting the accelerations of the object in three different dimensions of X-, Y- and Z-axis directions are necessary, each corresponding to the respective dimension.

FIG. 11 shows an example of the construction of a conventional 3-dimensional acceleration detecting apparatus heretofore considered. In this apparatus, triangular pyramid mount 52 is installed on base 51. The surfaces of mount 52 are formed in the directions of the three dimensions. Beam-shaped vibration plates 53, 54 and 55 are so mounted as to extend toward perpendicular directions from the respective surfaces of mount 52. Masses 56 to 58 are respectively attached to the freely vibrating ends of plates 53 to 55, and the plates 53 to 55 are vibrated by the vibration in X-, Y- and Z-axis directions of three dimensions.

Strain gauges are respectively mounted on plates 53 to 55 to convert the vibrating states of plates 53 to 55 to electric signals and to output the signals.

However, in such an acceleration detecting apparatus of the constructed described above, vibration plates 53 to 55 are mounted to extend in different directions, and the angular relationship of the extending directions of plates 53 to 55 must be accurately set. Therefore, the detecting apparatus must have a complicated construction and the operational characteristics must be regulated substantially in a manner similar to a manual procedure. This apparatus is indispensably difficult to be reduced in size, and is difficult to be, for example, interfaced with a microcomputer for executing suspension control of an automobile.

A detector for detecting an acceleration of one dimension in a simple case is composed of a vibration plate to be used in an apparatus as shown in FIG. 11, and a detector formed of semiconductor is considered to reduce its size. More particularly, a beam formed, for example, of polysilicon is cantilevered over a semiconductor so that a small interval is formed between the beam surface and the surface of the semiconductor substrate. When the beam is vibrated, an electrostatic capacity between the beam and the surface of the substrate varies, and the beam vibrating state is detected by detecting the variation in the capacity.

However, it is very difficult to construct a 3-dimensional acceleration detecting apparatus for detectors with the above-mentioned construction. If the beam is warped due to a temperature change, the interval between the beam and the surface of the substrate alters, causing the electrostatic capacity therebetween to change. Therefore, this apparatus cannot accurately and stably detect the acceleration.

It is in this case possible to set intrinsic resonance vibration frequencies to the respective beams by differentiating the lengths of the beams by combining several beams of the above-mentioned construction and to construct a vibrating spectrum detecting apparatus. However, since the interval between the beams and the surface of the substrate is small, if dust is introduced into the interval, it not only affects the capacity but also varies the resonance frequency of the beam, causing the vibration detecting operation to become unstable.

In addition, as disclosed, for example, in a thesis of LYNN MICHELLE ROYLANCE of IEEE TRANSACTIONS ON ELECTRON DEVICES, VOL., ED-26, NO. 12, DECEMBER 1979, a construction for holding a vibration beam formed of silicon between a pair of glass covers in a sandwich shape is considered. However, it is difficult to construct a small-sized 3-dimensional acceleration detecting apparatus of such a construction.

SUMMARY OF THE INVENTION

It is an object of the present invention to provide an acceleration detecting apparatus formed by a semiconductor capable of detecting both the acceleration and the vibrating state of a moving article with a sufficiently simple construction, to construct a detector by processing a semiconductor substrate by means similar to the case of manufacturing an ordinary semiconductor integrated circuit device and to provide a stable detecting characteristic impervious to changes in temperature.

It is another object of the present invention to provide an acceleration detecting apparatus formed by semiconductor capable of forming a detector for detecting both 3-dimensional accelerations and vibrations, constructed in one semiconductor chip.

It is still another object of the present invention to provide an acceleration detecting apparatus formed by a semiconductor integrated circuit section for processing a detection signal together with a detector in one semiconductor chip to simply integrate it into an electronic control apparatus.

It is still another object of the invention to provide an acceleration detecting apparatus, formed by one semiconductor device capable of being constructed in mass quantities and a small size, to detect, for example, the accelerating state or longitudinal and lateral fluctuated states of an automobile and to be effectively utilized as an acceleration/vibration detecting sensor for executing, for example, an electronic suspension control.

An acceleration detecting apparatus formed by semiconductor according to the present invention is formed by cutting a beam-shaped movable member, one end of which is fastened by etching to a semiconductor substrate formed with an integrated circuit and the other of which can freely vibrate, at the substrate, and a mass is provided at the end of the beam. A piezo resistance element, for generating an electric signal corresponding to the displaced state of the beam, is mounted at the fixed end of the beam.

More specifically, the member forming the movable beam is simply formed by etching means of the type used for manufacturing an ordinary semiconductor integrated circuit device, and a mass can be simply attached to the end of the beam also by etching means. In this case, the beam is formed in a sectional shape so that the thickness is sufficiently smaller than the width in such a manner that the beam is deflected in the perpendicular direction by the acceleration in the perpendicular direction and the bent state is detected by the piezo resistance element. The detection signal of the element is processed by a semiconductor circuit section formed on the semiconductor substrate, and output as an acceleration signal.

In the apparatus described above, when two sets of beams are formed in a perpendicularly extending state on the same semiconductor substrate and the beams are so set that the bending direction by the accelerations coincides with the surface of the substrate, the apparatus can detect perpendicular X- and Y-axis directions of two dimensional accelerations. When the beams are formed to bend in a direction perpendicular to the surface of the substrate, the apparatus can detect the acceleration of the Z-axis direction perpendicular to the X- and Y-axis directions. In other words, detectors for detecting 3-dimensional accelerations can be formed in one semiconductor chip, and a semiconductor circuit for processing the detection signals from the detectors can be formed in the chip.

BRIEF DESCRIPTION OF THE DRAWINGS

FIGS. 7A and 7B are views for describing the steps of manufacturing another beam;

FIG. 8A is a plan view showing the state of the detector of an acceleration detecting apparatus according to another embodiment of the present invention;

FIG. 8B is a plan view of the detecting apparatus;

FIGS. 9A and 9B are views showing the examples of the sectional structure taken along the line X—X in FIG. 8A;

DETAILED DESCRIPTION OF THE PREFERRED EMBODIMENTS

Figure 1:
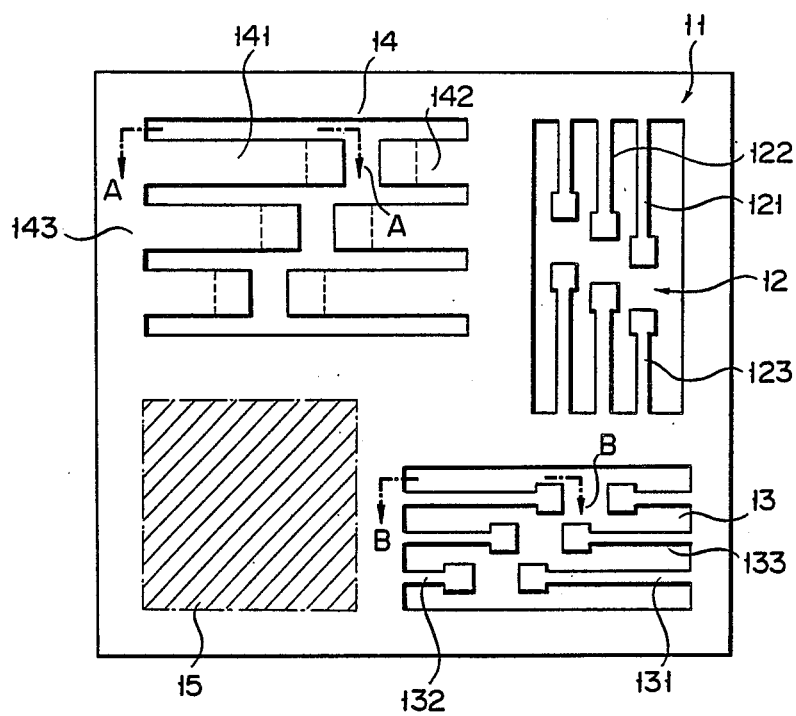
FIG. 1 is a plan view for describing a construction of an acceleration detecting apparatus formed by a semiconductor according to an embodiment of the present invention.

FIG. 1 is a plan view of an IC chip formed to have a plurality of detectors for detecting accelerations. X-axis direction detector 12, Y-axis direction detector 13 and Z-axis direction detector 14 are planely arranged on semiconductor substrate 11. An information processor for processing the detection signals from detectors 12 to 14, and a signal processing circuit 15 by semiconductor integrated circuit such as amplifiers are formed on substrate 11.

Detectors 12 to 14 respectively have movable members bent when mechanical vibration and acceleration are applied. The members of detectors 12 to 14 are respectively formed of a plurality of thin cantilevered beams 121, 122, . . . . . . , 131, 132, . . . , and 141, 142, . . . , and shown in FIGS. 2A and 2B.

Figure 2A:
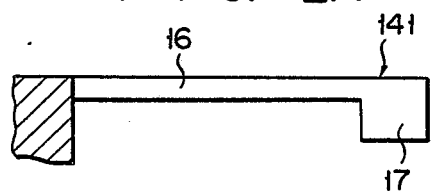
FIGS. 2A and 2B are sectional views of the portions respectively corresponding to the lines A—A and B—B of an example of a beam forming a movable member of the detecting apparatus.

FIG. 2A shows beam 141 for forming detector 14 for detecting an acceleration of Z-axis direction and hence a vertical direction on the surface of substrate 11. Beam 141 is formed of a vibration plate 16, cut by etching in a thin and slender plate shape from a silicon substrate for forming substrate 11. In this case, the horizontal surface plane of plate 16 is parallel to that of substrate 11. Plate 16 is fastened integrally at one end to substrate 11, and the other end is freely movable. In other words, plate 16 is constructed so as to bend only in a direction perpendicular to the surface of substrate 11.

Mass 17 is formed at the free end of plate 16, and formed by etching by means similar to cutting by etching of plate 16. When an acceleration vibrates substrate 11 in a direction perpendicular to the surface of substrate 11, plate 16 is bent in response to the acceleration amount.

Figure 2B:
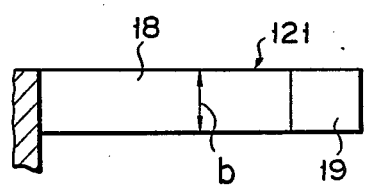

FIG. 2B shows beam 121 of X-axis direction detector 12, and a beam for forming Y-axis direction detector 13 is similarly constructed. Beam 121 is formed of vibration plate 18 having a plane set to be perpendicular to the plane of plate 16. One end of plate 18 is fastened, and the other is freely movable. In other words, the vibration plate is constructed to bend only in a direction parallel to the surface of substrate 11. In this case, beam 121 of detector 12 is set to extend in a direction perpendicular to X-axis direction, and the beam of detector 13 is set to extend in a direction perpendicular to the Y-axis direction.

Mass 19 is formed at the free end of plate 18. When an acceleration perpendicular to the direction that plate 18 extends is applied to plate 18, plate 18 is bent in the X-axis direction in response to the acceleration amount due to the presence of mass 19.

Beams 121, 122, . . . , 131, 132, . . . , and 141, 142, . . . for forming detectors 12 to 14 are formed in different lengths from each other. Resonance frequencies of a wide frequency range are set with respect to the vibrations of X-, Y- and Z-axis directions. In other words, even if the vibrating frequencies of X-, Y- and Z-axis directions are variably altered, the beams are so constructed that they are capable of resonating with the proper vibrating frequency.

Figure 3:
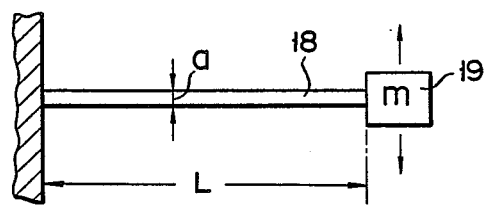
FIG. 3 is a view for describing the intrinsic vibration frequency of the above beam.

The intrinsic vibrating frequency $f_0$ in each beam is represented by the following equation:

$$f_0 = (1/2\pi)\sqrt{bEa^3/6L^3m}$$

where a is the thickness of the bending direction of the beam as shown in FIG. 3, L is its length, m is mass and b is the width of the beam as shown in FIG. 2B.

Figure 4:
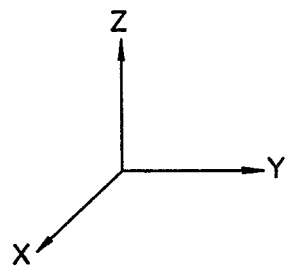
FIG. 4 is a view showing the acceleration detecting direction detected by the apparatus.

The intrinsic vibrating frequency can be freely selected by the width, thickness, length and mass of the beam, and the vibrating spectrum to be detected can be arbitrarily selected by combining the length of a plurality of beams for forming detectors 12 to 14. 3-dimensional accelerations of X-, Y- and Z-axis directions shown in FIG. 4 can be respectively detected by detectors 12, 13 and 14, and 3-dimensional vibration states can be detected.

Thin cantilevered beams for forming detectors 12 to 14 are formed by cutting a silicon wafer by etching a semiconductor substrate for forming an IC chip, and FIGS. 5A to 5D show the manufacturing steps.

This example shows the steps of manufacturing a pair of opposed beams 141 and 142 for forming Z-axis detector 14. As first shown in FIG. 5A, N-type silicon substrate 21 of 2–3 Ω•cm (100) of 400 to 600 μm thick. When forming signal processing circuit 15 of MOS transistors, bipolar transistors by an ordinary IC manufacturing process on the main surface of substrate 11, a piezo resistance layer 22 of P-type diffused resistor is formed. Further, wiring layer 23 of aluminum is formed to lead a signal from layer 22.

Figure 5A:
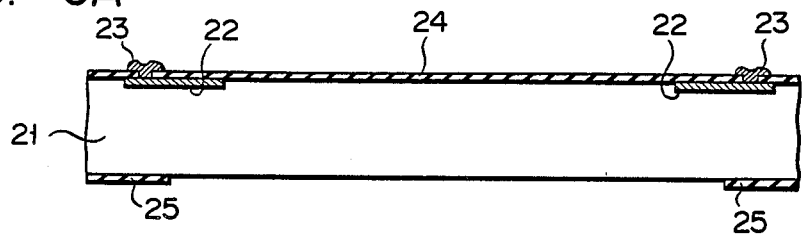
FIGS. 5A to 5D are views sequentially showing the steps of manufacturing the above beam.
Figure 5B:
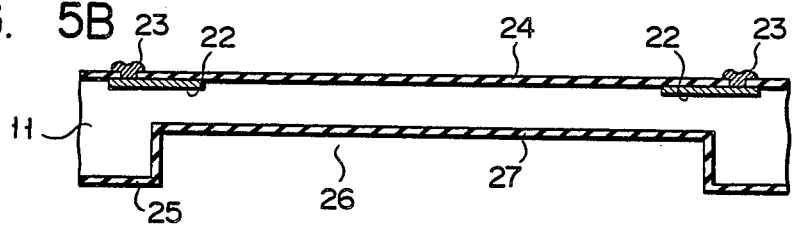

Oxide films 24 and 25 are respectively formed as insulating films on the front and back surfaces of substrate 21. Film 24 of the front surface side is not shown in detail, but is, for example, formed to remove the other portion by photo etching, except the pattern of the movable member of detector 14 in FIG. 1. However, in this example, the oxide film between a pair of opposed beams 141 and 142 is not removed. Film 25 of the back surface side is formed to remove a region to be formed with the beam of the detector. With films 24 and 25 as masks substrate 21 is removed by anisotropic alkaline etching from both side surfaces to form space 26 on the back surface of substrate 21, as shown in FIG. 5B.

When utilizing the plane orientation (110) of substrate 21, substrate 21 is etched perpendicularly at 90° by alkaline etching of anisotropic KOH with respect to plane (110) to form a vertical deep groove having a plane (111). An angle for forming two planes (111) etched perpendicularly to the A plane (110) is approx. 109°, and the accelerations of X- and Y-axis directions can be separated.

Substrate 21 is etched from the surface according to a mask pattern of film 14 by etching from the front surface side of substrate 21, and etched up to the back surface side of the substrate to cut the original dies of cantilevered beams 141, 142, . . . to become movable members.

In the etching step, not anisotropic etching but silicon etchant, for example, fluoric acid or nitric acid, is used in a planar direction, and yet any shape can be formed. In this case, gold or platinum is used as a mask.

Space 26 in FIG. 5B is set so as not to contact with the movable member when detecting acceleration, and is formed in a depth of 100 to 200 μm. Insulating film 27 of SiO$_2$ or Si$_3$N$_4$ is formed on the inner surface of space 26.

Figure 5C:
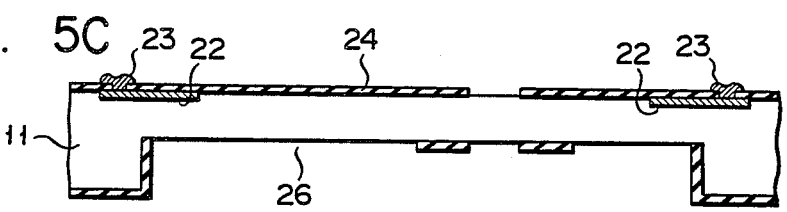

Then, as shown in FIG. 5C, films 24 and 27 are partially removed to form masks, layer 23 is protected by wax, and plate 12, exposed in this state, is simultaneously etched from both front and back surfaces. Thus, substrate 21 is simultaneously etched from both front and back surfaces, and when a penetrating region is formed at substrate 21, the etching is stopped.

Figure 5D:
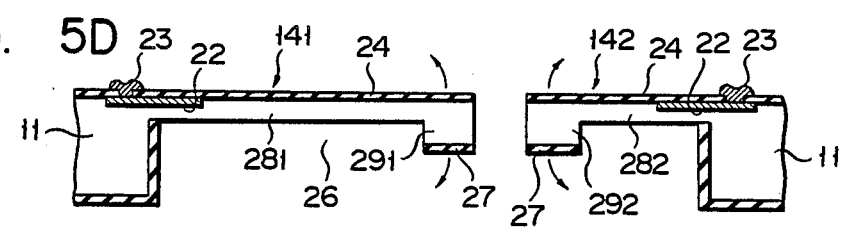

Beams 141 and 142 are formed as shown in FIG. 5D by the above-mentioned etching process. In this case, thin beam members 281 and 282 are formed according to the pattern of film 27 of the back surface, and masses 291 and 292 are formed at the portions corresponding to film 27. In other words, beam 141 and 142 thus formed are bent when accelerations are applied as designated by arrows, and the bending states can be detected by variations in the resistance value in layer 22.

In the acceleration detecting apparatus constructed as described above, the beams are formed as described, and substrate 21 is entirely wet etched by fluoric acid of isotropic etching or plasma etched by isotropic etching for a short time to smooth the surface shapes of beam members 281, 282 and mass 291, 292, and the corners of the ends of members 181 and 182 are rounded, thereby providing a preferable construction. During the alkaline etching as described above, the corner of the member formed by etching becomes acute, due to anisotropic etching of a crystalline orientation. Therefore, a stress concentration occurs at the acute corner, reducing its strength; but when the corner is rounded, as described above, this drawback can be effectively eliminated.

Figure 6A:
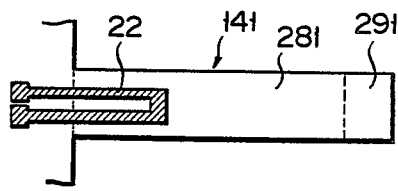
FIGS. 6A and 6B are views showing the state of a piezo resistance element mounted on the beam.

FIG. 6A shows the state of piezo resistance layer 22 formed on beam 141 and having crystal orientation of planes (110). Layer 22 forms, for example, four piezo resistors, which may be connected in a bridge. To regulate the sensitivity, piezo resistance elements may be formed in various crystalline orientations.

FIGS. 7A and 7B show means for forming beams for forming movable members for constructing detectors 12 and 13 for detecting X- and Y-axis accelerations. As shown in FIG. 7A, mask patterns of oxide films 24 and 27 are formed on the front and back surface sides of substrate 21. The patterns are formed, as shown in FIGS. 2B and 3, in the shape of a thin beam in the lengthwise direction of substrate 21. When substrate 21 is etched from both sides in this state, thin beams 301 and 302 are so formed as to bend only in a direction parallel to the surface of substrate 21 as shown in FIG. 7B, and masses 311 and 312 are respectively formed at the ends of beams 301 and 302.

Figure 6B:
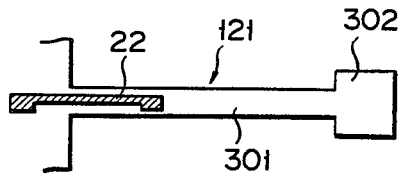

Means thus formed for detecting the bent state of the beam is formed of piezo resistance layer 22 as shown in FIG. 6B, and layer 22 is formed, for example, at the position displaced from the center line of beam 301. In this case, layer 22 is disposed to reversely vary in the resistance in response to the compression and tensile forces.

In the embodiment described above, the movable member of one detector is formed of a plurality of beams, and the beams are formed in different lengths. Even if the vibrating frequencies of mechanical movements of the accelerations are different, the accelerations by the vibration can be effectively detected by the detector. However, when detecting the mere presence of vibration or acceleration, a detector for detecting movable members of beams corresponding to X-, Y- and Z-axis directions may be constructed. Further, in the embodiment described above, the beams are cantilevered, but the beams may be fastened at both ends or arbitrarily movable.

FIGS. 8A and 8B show an acceleration detecting apparatus according to the second embodiment of the present invention. This apparatus is constructed of a sealed structure. In the second embodiment, detectors for detecting 3-dimensional accelerations are formed on one semiconductor substrate, similarly to the first embodiment. As shown in FIG. 8A, X-axis detector 12, Y-axis direction detector 13 and Z-axis direction detector 14 are formed on semiconductor substrate 11. Movable members of detectors 12 to 14 are respectively formed of two thin cantilevered beams 121, 122, 131, 132, 141, 142. Further, a signal processing circuit 15 of an IC configuration is formed on substrate 11, and electrode pads 41 and 42 for connecting the external circuits are formed at corners of substrate 11. Substrate 11 is coated with upper cover 43, leaving pads 41 and 42 exposed, as shown in FIG. 8B.

Beams 121, 122, 131, 132, 141, 142 are respectively formed in independent frames, and the ranges of moving masses formed at the ends of the beams are restricted by stoppers.

More specifically, beam 121 of the X-axis direction detector is restricted by the side walls of the frame for containing beam 121 as stoppers 12a and 12b, and the interval between the mass of the beam and the stoppers 12a, 12b is set to a corresponding allowable acceleration value of detected acceleration. Similarly, stoppers of beams 131, 132 of detector 13 are formed of side walls of the frame of beams 131, 132, but the stoppers of beams 141, 142 of detector 14 are formed on the upper cover coated on substrate 11.

Piezo resistance layers are formed on the beams forming detectors 12 to 14, similarly to the first embodiment, and connected to signal processing circuit 15 to output detection signals, corresponding to the bending amounts of beams, through pads 41 and 42.

Upper cover 43 and lower cover 44 are formed on substrate 11, as shown in FIG. 9A. Thus, substrate 11 is interposed between covers 43 and 44 in a sandwich configuration.

FIG. 9A is a cross-sectional view of beam 141 of detector 14 shown in FIG. 8A. Beam 141, which can bend only in the Z-axis direction, is formed in an independent frame by etching substrate 11, as in the first embodiment.

The inner surface of upper cover 43 facing substrate 11 is cut to form space 45 which corresponds in position to region 431 where detectors 12 to 14 and processing circuit 15 are arranged (i.e., the region indicated by the broken line in FIG. 8B). Space 46 is formed by cutting the surface of lower cover 44 facing substrate 11, at a location corresponding to a region where detector 14 having beam 141 is formed. Beam 141 is vibrated between spaces 45 and 46, and inner surfaces of covers 43 and 44 act as stoppers for restricting the moving range of the mass of beam 141. Covers 43 and 44 are made of a material (e.g., semiconductor or glass) which has an thermal expansion coefficient similar to that of substrate 11.

A vibration damper, such as silicone oil, is injected as required and sealed in the chamber formed of spaces 45, 46 in covers 43, 44.

Figure 10:
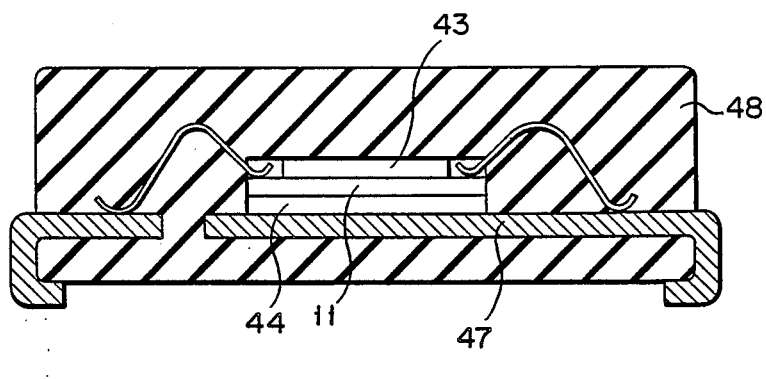
FIG. 10 is a sectional view for describing the state of packaging the detecting apparatus.
Figure 11:
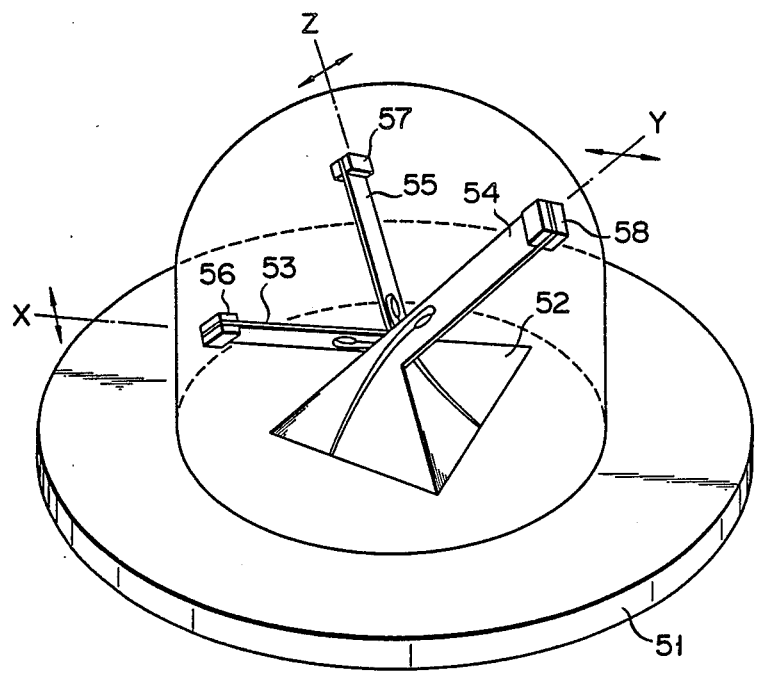
FIG. 11 is a view showing an example of a conventional 3-dimensional acceleration detecting apparatus heretofore considered.

FIG. 10 shows a packaging structure of an acceleration detecting apparatus formed in a sealed structure as described above. A detecting chip of a 3-layer structure of substrate 11 for forming detectors 12 to 14, upper cover 43, and lower cover 44 are fixedly bonded on lead frame 47. Electrode pads 41, 42 are led by wire bonding, and a sensor chip is sealed by synthetic resin 48 together with frame 47.

In the embodiments described above, the masses mounted at the ends of the beams are formed by cutting in large size from the semiconductor substrate. However, the masses may be formed by the depositing, on the ends of the beam, of a metal layer 49 of solder, as shown in FIG. 9B. When the masses are made of metal layer 49 in this manner, space 46 (FIG. 9A) will be unnecessary. In this case, space 46, which has been formed simultaneously with beam 141, vibrates beam 141.

What is claimed is:

1. An acceleration detecting apparatus formed by a semiconductor comprising:
    a semiconductor substrate having a front and a back surface;
    acceleration detecting means including first, second and third movable members located in first, second and third frames respectively, said frames being formed by cutting said substrate from the front and the back surface, each of said movable members being formed of a plurality of beams which are made by cutting said substrate from the front and back surface, each of said beams being a cantilever extending parallel to the front and back surfaces of said substrate and having a movable portion, the beams formed in said first frame being capable of vibrating an X-axis direction parallel to the front and back surfaces of said substrate, the beams formed in said second frame being capable of vibrating in Y-axis direction also parallel to the surfaces of said substrate, and the beams formed in said third frame being capable of vibrating in Z-axis direction perpendicular to the front and back surface of said substrate; and
    first, second and third piezo resistance means formed at the movable portions of said beams, respectively, and each having a resistance which varies in response to a bending degree of the beam, thereby generating an electrical signal corresponding to the resistance thereof.

2. An apparatus according to claim 1, wherein a plurality of beams for forming said first to third movable members are formed to comprise a pair of beams extending from opposed sides of said first to third frames, and freely vibrating ends of the pair of beams are opposed at a small interval.

3. An apparatus according to claim 1, wherein the thin cantilevered beams for forming said first movable member are constructed to respectively have surfaces perpendicular to the surface of said substrate and to vibrate in different resonating frequencies by applying an acceleration in the X-axis direction to said substrate, the thin cantilevered beams for forming the second movable member are constructed to respectively have surfaces perpendicular to the surface of said substrate and to vibrate in different resonating frequencies by applying an acceleration in the Y-axis direction perpendicular to the X-axis direction to said substrate, the thin cantilevered beams for forming the third second movable member are constructed to respectively have surfaces perpendicular to the surface of said substrate and to vibrate in different resonating frequencies by applying an acceleration in the Y-axis direction perpendicular to the X-axis direction to said substrate, and the thin cantilevered beams for forming the third movable member are constructed to have surfaces parallel to the surface of said substrate and to vibrate in different resonating frequencies by applying and acceleration in the Z-axis direction, perpendicular to the surface of said substrate.

4. A 3-dimensional acceleration detecting apparatus formed by a semiconductor comprising:
    a semiconductor substrate having a front and a back surface;
    first acceleration detecting means formed by cutting through the front and back surfaces of said substrate to form a first movable member which bends when subjected to an acceleration in an X-axis direction parallel to the surfaces of said substrate;
    second acceleration detecting means formed by cutting through the front and back surfaces of said substrate to form a second movable member which bends when subjected to an acceleration in a Y-axis direction perpendicular to the X-axis direction and parallel to the surfaces of said substrate;
    third acceleration detecting means formed by cutting through the front and back surfaces of said substrate to form a third movable member which bends when subjected to an acceleration in a Z-axis direction perpendicular to the surfaces of said substrate;

first, second and third piezo resistance means formed at movable portions of said first, second and third movable members for generating electric signals responsive to a degree of bending for each member;

a signal processing means formed of an integrated circuit in a region different from said first, second and third acceleration detecting means of said substrate to be supplied with output acceleration detection signals of X-, Y- and Z-axis directions;

said first, second and third acceleration detecting means are formed of a plurality of thin cantilevered beams in first, second and third frames formed by etching said substrate and in independent regions of said substrate, so that the first, second and third movable members extend from the edges of the frames, and masses are respectively provided at the freely vibrating ends of the beams; and a plurality of beams formed in said first frame have a rectangular section with a thickness perpendicular to the surfaces of said substrate being greater than a width parallel to the surfaces of the substrate, said beams of said first frame being bendable in the X-axis direction parallel to the surfaces of said substrate; a plurality of beams formed in said second frame have a rectangular section with a thickness perpendicular to the surfaces of said substrate being greater than a width parallel to the surfaces of the substrate, said beams of said second frame being bendable in the Y-axis direction parallel to the surfaces of said substrate; and a plurality of beams formed in said third frame have a rectangular section with a thickness perpendicular to the surfaces of said substrate being less than a width parallel to the surfaces of the substrate, said beams of said third frame being bendable in the Z-axis direction perpendicular to the surfaces of substrate.

5. A 3-dimensional acceleration detecting apparatus formed by a semiconductor comprising:

a semiconductor substrate having a front and back surface;

first acceleration detecting means formed by cutting through the front and back surfaces of said substrate to form a first movable member which bends when subjected to an acceleration in an X-axis direction parallel to the surfaces of said substrate;

second acceleration detecting means formed by cutting through the front and back surfaces of said substrate to form a second movable member which bends when subjected to an acceleration in a Y-axis direction perpendicular to the X-axis direction and parallel to the surfaces of said substrate;

third acceleration detecting means formed by cutting through the front and back surfaces of said substrate to form a third movable member which bends when subjected to an acceleration in a Z-axis direction perpendicular to the surfaces of said substrate;

first, second and third piezo resistance means formed at movable portions of said first, second and third movable members for generating electric signals responsive to a degree of bending of each member;

a signal processing means formed of an integrated circuit in a region different from said first, second and third acceleration detecting means of said substrate to be supplied with output signals from said piezo resistance means and to externally output acceleration detection signals of X-, Y- and Z-axis directions;

said first, second and third acceleration detecting means are respectively formed in a plurality of frames formed by cutting to penetrate the front and back surfaces of said substrate; on thin cantilevered beam is formed in each frame by cutting said substrate; masses are respectively provided at the freely vibrating ends thereof, and said first, second and third movable members are formed of the beams;

one of said plurality of frames for forming said first acceleration detection means is formed in a shape of a rectangle extending parallel to the substrate in the Y-axis direction, and a plurality of said thin cantilevered beams are formed therein extending in the Y-axis direction, each cantilevered beam being fixed at one end and having a free end bendable in the X-axis direction so that the free end of each beam vibrates between parallel side walls of said frame extending in the Y-axis direction; and one of said plurality of frames for forming said second acceleration detecting means is formed in a shape of a rectangle extending through said substrate in the X-axis direction, and a plurality of said thin cantilevered beams are formed therein extending in the X-axis direction, each cantilevered beam being fixed at one end and having a free end bendable in the Y-axis direction so that the free end of each beam vibrates between parallel side walls of each frame extending in the X-axis direction.

* * * * *